US012627706B2

(12) United States Patent
Krishtal et al.

(10) Patent No.: US 12,627,706 B2
(45) Date of Patent: May 12, 2026

(54) VOLUMETRIC DISTRIBUTED DENIAL OF SERVICE ATTACK MITIGATION

(71) Applicant: F5, Inc., Seattle, WA (US)

(72) Inventors: Vadim Krishtal, Rishon le Zion (IL); Tomer Pasman, Holon (IL); Eyal Pery, Ramat Gan (IL)

(73) Assignee: F5, Inc., Seattle, WA (US)

( * ) Notice: Subject to any disclaimer, the term of this patent is extended or adjusted under 35 U.S.C. 154(b) by 107 days.

(21) Appl. No.: 18/521,565

(22) Filed: Nov. 28, 2023

(65) Prior Publication Data

US 2025/0294052 A1     Sep. 18, 2025

(51) Int. Cl.
*H04L 9/40* (2022.01)

(52) U.S. Cl.
CPC ........ *H04L 63/1458* (2013.01); *H04L 63/166* (2013.01)

(58) Field of Classification Search
CPC .......................... H04L 63/1458; H04L 63/166
See application file for complete search history.

(56) References Cited

U.S. PATENT DOCUMENTS

| | | | |
|---|---|---|---|
| 4,783,828 A | 11/1988 | Sadjadi | |
| 6,118,893 A | 9/2000 | Li | |
| 6,537,488 B1 | 3/2003 | Okumura et al. | |
| 6,748,056 B1 | 6/2004 | Bapriotti | |
| 6,769,066 B1 | 7/2004 | Botros | |
| 7,228,412 B2 | 6/2007 | Freed | |
| 7,406,606 B2 | 7/2008 | Chawla | |

| | | | |
|---|---|---|---|
| 7,441,429 B1 | 10/2008 | Nucci | |
| 7,519,834 B1 | 4/2009 | Dondeti | |
| 7,568,224 B1 | 7/2009 | Jennings | |

(Continued)

FOREIGN PATENT DOCUMENTS

| | | |
|---|---|---|
| CN | 109 391 600 A | 2/2019 |
| CN | 110 365 712 A | 10/2019 |
| WO | WO 02/35860 A1 | 5/2002 |

OTHER PUBLICATIONS

BIG-1P® Analytics: Implementations, version 11.3, Nov. 15, 2012, F5 Networks, Inc., pp. 1-40.

(Continued)

*Primary Examiner* — Stephen T Gundry
(74) *Attorney, Agent, or Firm* — Troutman Pepper Locke LLP

(57) ABSTRACT

Technologies related to mitigation of volumetric distributed denial of service attacks are disclosed. Malicious network connection request detection can be performed using a first network traffic management module (NTMM) that executes before network connection resources are allocated and a second NTMM that executes after connection resource allocation. The second NTMM can be used to determine whether a connection request is from a potential bad actor. If the request is from a potential bad actor, the second NTMM can add an identifier for the potential bad actor to a list of potential bad actors. When a subsequent connection request is received, the first NTMM can generate the identifier based on the subsequent request and determine whether it is stored in the list of potential bad actors. If it is, the first NTMM can drop the subsequent request before connection resources for establishing the second request are allocated.

17 Claims, 13 Drawing Sheets

(56) References Cited

U.S. PATENT DOCUMENTS

| | | | |
|---|---|---|---|
| 7,624,447 | B1 | 11/2009 | Horowitz |
| 7,743,415 | B2 | 6/2010 | Poletto et al. |
| 8,572,733 | B1 | 10/2013 | Rockwood |
| 8,578,482 | B1 | 11/2013 | Yang |
| 8,756,684 | B2 | 6/2014 | Frantz |
| 8,886,620 | B1 | 11/2014 | Mukerji |
| 8,943,588 | B1 | 1/2015 | Speegle |
| 9,032,519 | B1 | 5/2015 | Maher |
| 9,077,709 | B1 | 7/2015 | Dall |
| 9,203,837 | B2 | 12/2015 | Pierson |
| 9,578,055 | B1 | 2/2017 | Khanal |
| 9,628,499 | B1 | 4/2017 | Yu |
| 9,654,485 | B1 | 5/2017 | Neumann |
| 9,900,344 | B2 | 2/2018 | Smith |
| 9,942,250 | B2 | 4/2018 | Stiansen |
| 9,948,629 | B2 | 4/2018 | Eisen |
| 9,967,250 | B2 | 5/2018 | Johansson |
| 10,050,792 | B1 | 8/2018 | Johnson |
| 10,237,298 | B1 | 3/2019 | Nguyen |
| 10,397,250 | B1 | 8/2019 | Shemesh |
| 10,693,901 | B1 | 6/2020 | Chan |
| 11,228,609 | B1 | 1/2022 | Finkelshtein |
| 11,336,575 | B1 | 5/2022 | Milley et al. |
| 11,574,316 | B1 * | 2/2023 | Hoskins ............ G06Q 30/0609 |
| 11,888,870 | B2 * | 1/2024 | Garyani ................ G06F 21/554 |
| 11,968,226 | B1 | 4/2024 | Chychi |
| 12,095,747 | B2 * | 9/2024 | Stuntebeck ......... H04L 63/0464 |
| 12,483,617 | B2 * | 11/2025 | Shastri .................... H04L 45/04 |
| 2002/0116615 | A1 | 8/2002 | Nguyen |
| 2003/0042439 | A1 | 3/2003 | Rusu |
| 2003/0073091 | A1 | 4/2003 | Krylov |
| 2003/0145232 | A1 | 7/2003 | Poletto |
| 2003/0199762 | A1 | 10/2003 | Fritz |
| 2004/0037326 | A1 | 2/2004 | D'souza |
| 2004/0103283 | A1 | 5/2004 | Hornak |
| 2004/0170123 | A1 | 9/2004 | Carpenter |
| 2005/0027846 | A1 | 2/2005 | Nolfe |
| 2005/0111367 | A1 | 5/2005 | Jonathan Chao |
| 2005/0195840 | A1 | 9/2005 | Krapp |
| 2005/0198519 | A1 | 9/2005 | Tamura |
| 2006/0031483 | A1 | 2/2006 | Lund |
| 2006/0031928 | A1 | 2/2006 | Conley |
| 2007/0014276 | A1 | 1/2007 | Bettink |
| 2007/0118894 | A1 | 5/2007 | Bhatia |
| 2007/0280114 | A1 | 12/2007 | Chao |
| 2007/0294187 | A1 | 12/2007 | Scherrer |
| 2008/0028467 | A1 | 1/2008 | Kommareddy |
| 2008/0263215 | A1 | 10/2008 | Schnellbaecher |
| 2008/0320567 | A1 | 12/2008 | Shulman |
| 2009/0199297 | A1 | 8/2009 | Jarrett |
| 2010/0031315 | A1 | 2/2010 | Feng |
| 2010/0070451 | A1 | 3/2010 | Hugues |
| 2010/0284282 | A1 | 11/2010 | Solie |
| 2010/0325418 | A1 | 12/2010 | Kanekar |
| 2011/0012586 | A1 | 1/2011 | Montanar |
| 2011/0072516 | A1 | 3/2011 | Cohen |
| 2011/0154026 | A1 | 6/2011 | Edstrom |
| 2011/0264905 | A1 | 10/2011 | Ovvsiannikov |
| 2012/0051236 | A1 | 3/2012 | Hegde |
| 2012/0079592 | A1 | 3/2012 | Pandrangi |
| 2012/0117239 | A1 | 5/2012 | Holloway |
| 2012/0144487 | A1 | 6/2012 | Kim |
| 2012/0167210 | A1 | 6/2012 | Oro Garcia et al. |
| 2012/0173710 | A1 | 7/2012 | Rodriguez |
| 2012/0227106 | A1 | 9/2012 | Shulman |
| 2012/0323700 | A1 | 12/2012 | Aleksandrovich |
| 2013/0080407 | A1 | 3/2013 | Levow |
| 2013/0263268 | A1 | 10/2013 | Kim et al. |
| 2013/0276114 | A1 | 10/2013 | Friedrichs |
| 2013/0305365 | A1 | 11/2013 | Rubin |
| 2014/0095865 | A1 | 4/2014 | Yerra |
| 2014/0289854 | A1 | 9/2014 | Mahvi |
| 2014/0298419 | A1 | 10/2014 | Boubez |
| 2014/0310805 | A1 | 10/2014 | Kandekar |
| 2014/0317739 | A1 | 10/2014 | Be'ery |

| | | | |
|---|---|---|---|
| 2015/0067328 | A1 | 3/2015 | Yin |
| 2015/0088662 | A1 | 3/2015 | Moller |
| 2015/0163234 | A1 | 6/2015 | Tal |
| 2015/0215334 | A1 | 7/2015 | Bingham |
| 2015/0271179 | A1 | 9/2015 | Nang |
| 2015/0295945 | A1 | 10/2015 | Canzanese |
| 2015/0310196 | A1 | 10/2015 | Turgeman |
| 2016/0021084 | A1 | 1/2016 | Eisen |
| 2016/0021117 | A1 | 1/2016 | Harmon |
| 2016/0127406 | A1 | 5/2016 | Smith |
| 2016/0182542 | A1 | 6/2016 | Staniford |
| 2016/0337314 | A1 | 11/2016 | Yu |
| 2017/0171231 | A1 | 6/2017 | Reybok, Jr. |
| 2017/0249306 | A1 | 8/2017 | Alien |
| 2017/0318053 | A1 | 11/2017 | Singh |
| 2018/0124073 | A1 | 5/2018 | Scherman |
| 2018/0124300 | A1 | 5/2018 | Brook |
| 2018/0139228 | A1 | 5/2018 | Kanakarajan |
| 2018/0165457 | A1 | 6/2018 | Holz |
| 2020/0296125 | A1 | 9/2020 | Alderson |
| 2020/0351244 | A1 * | 11/2020 | Moore .................... H04L 63/20 |
| 2021/0075790 | A1 | 3/2021 | Hebert |
| 2022/0121362 | A1 | 4/2022 | Liu et al. |
| 2023/0006910 | A1 * | 1/2023 | Dewar .................... H04L 69/28 |
| 2023/0080679 | A1 * | 3/2023 | Koral .................... H04W 60/04 |
| | | | 726/6 |
| 2023/0146962 | A1 | 5/2023 | Reddy et al. |
| 2023/0362192 | A1 | 11/2023 | Ballew |
| 2023/0379405 | A1 | 11/2023 | Chhabra |
| 2023/0394138 | A1 | 12/2023 | Noeth |
| 2023/0401332 | A1 * | 12/2023 | Vahidnia ............... H04L 63/101 |
| 2023/0421478 | A1 | 12/2023 | Chhabra |
| 2024/0073244 | A1 | 2/2024 | Duan |
| 2024/0073249 | A1 | 2/2024 | Cirello Filho |
| 2024/0121111 | A1 * | 4/2024 | Gomez ............... H04W 12/069 |
| 2024/0163094 | A1 | 5/2024 | Karas |
| 2024/0171484 | A1 | 5/2024 | Munoz |
| 2024/0214416 | A1 | 6/2024 | Tracy |
| 2024/0236002 | A1 | 7/2024 | Huson |
| 2024/0265057 | A1 | 8/2024 | Kol |
| 2024/0283674 | A1 | 8/2024 | Kanda |
| 2024/0291744 | A1 | 8/2024 | Chhabra |
| 2024/0291745 | A1 | 8/2024 | Chhabra |
| 2024/0356625 | A1 * | 10/2024 | Walker .............. H04B 7/15528 |
| 2024/0356849 | A1 * | 10/2024 | Inbal ..................... H04L 45/566 |
| 2025/0007835 | A1 | 1/2025 | Chhabra |
| 2025/0007937 | A1 | 1/2025 | Mittal |
| 2025/0039143 | A1 * | 1/2025 | Parla .................... H04L 63/1433 |
| 2025/0077238 | A1 * | 3/2025 | Obando Chacon ... G06F 40/284 |
| 2025/0097100 | A1 * | 3/2025 | Raja .................... H04L 41/0806 |
| 2025/0106254 | A1 * | 3/2025 | Clark ..................... H04L 63/20 |
| 2025/0106634 | A1 * | 3/2025 | Sankar Mantha .. H04W 12/122 |
| 2025/0126141 | A1 * | 4/2025 | Uthaman ............ H04L 63/1425 |
| 2025/0148034 | A1 | 5/2025 | Shribman |
| 2025/0159039 | A1 | 5/2025 | Shribman |
| 2025/0168470 | A1 * | 5/2025 | Pansare .............. H04N 21/8456 |
| 2025/0175556 | A1 * | 5/2025 | Meredith .............. H04M 3/436 |
| 2025/0181420 | A1 * | 6/2025 | Talavera .............. G06F 9/5083 |
| 2025/0193681 | A1 * | 6/2025 | Pandit ................ H04W 12/121 |
| 2025/0203486 | A1 * | 6/2025 | Karampatsis ....... H04L 41/0894 |

OTHER PUBLICATIONS

F5 Networks, "BIG-1 P Local Traffic Manager: Concepts", version 11.4, pp. 1-178, retrieved from https://support.f5.comkb/en-us/products/bigipltm/manuals/producl/ltm-concepts-11-4-0 .html on Feb. 12, 2015.

F5 Networks, "BIG-1P Local Traffic Manager: Implementations", version 11.4, pp. 1-234, retrieved from https://support.5 .com/kb/en-us/products/bigipltm/manuals/producl/ltm-implementations-11-4-0 .html on Feb. 12, 2015.

F5 Networks, "BIG-1 P Local Traffic Manager: Monitors Reference", version 11.4, pp. 1-106, retrieved from hllps://support.f5 .com/kb/en-us/products/big-ip ltm/manuals/producl/ltm-monitorsreference-11-4-0 .html on Feb. 12, 2015.

F5 Networks, "Operations Guide 1.0 F5 Local Traffic Manager and Global Traffic Manager", pp. 1.144, retrieved from hllps://support.

(56) References Cited

OTHER PUBLICATIONS f5 .com/kb/en-us/products/bigipltm/manuals/product/f5-1 tm-gtm-operations-guide-1--0 .html on Feb. 12, 2015.

F5 Networks, "Release Note: BIG-IP L TM and TMOS", version 11.4.1, pp. 1-58, retrieved from hllps://support.f5.com/kb/en-us/products/bigipltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IPASM", Release Notes, Jun. 13, 2016, pp. 1-18, version 11.6.1 F5 Networks, Inc.

F5 Networks, Inc., "BIG-IP@Analytics: Implementations", Manual, Jan. 31, 2014, pp. 1-50, Version 11.5.

F5 Networks, Inc., "BIG-IP®Analytics: Implementations", Manual, Aug. 25, 2014, pp. 1-62, v11.6, F5 Networks, Inc.

F5 Networks, Inc., "BIG-IP@ Application Security Manager TM: Getting Started", Manual, Aug. 25, 2014, pp. 1-78, version 11.6, F5 Networks, Inc.

F5 Networks, Inc., "BIG-IP® Application Security Manager TM: Implementations", Manual, Aug. 25, 2014, pp. 1-420, version 11.6, F5 Networks, Inc.

F5 Networks, Inc., "BIG-IP@Application Security ManagerTM: Implementations", Manual, Jan. 31, 2014, pp. 1-396, Version 11.5.

F5 Networks, Inc., "BIG-IP® Application Security ManagerTM:Implementations", F5 Networks, Inc., Dec. 10, J014, version 11.6, pp. 1-420, Dec. 10, 2024.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, ,11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

F5 Networks, Inc., "BIG-IP Application Security Manager: Implementations", F5 Networks, Inc., Dec. 10, 2014, version 11.6, pp. 1-420.

F5 Networks, Inc., "BIG-IP® Application Security Manager™: Implementations", Manual, Nov. 10, 2017, pp. 1-348, version 13.0, F5 Networks, Inc.

International Search Report dated Mar. 25, 2024 issued in International Application No. PCT/US2023/083393.

European Search Report Date Dec. 18, 2024. European Patent Application No. 24193938.8.

European Search Report Dated Feb. 17, 2025. European Patent AppIn No. 24216113.1.

* cited by examiner

FIG. 1

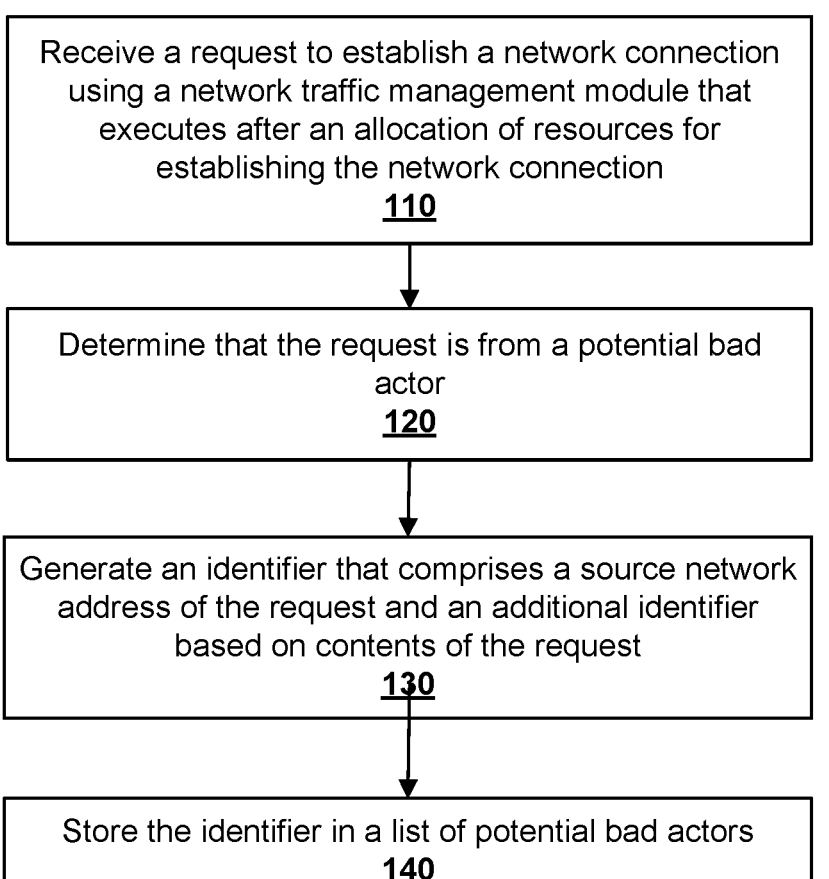

Receive a request to establish a network connection using a network traffic management module that executes after an allocation of resources for establishing the network connection
110

Determine that the request is from a potential bad actor
120

Generate an identifier that comprises a source network address of the request and an additional identifier based on contents of the request
130

Store the identifier in a list of potential bad actors
140

FIG. 3

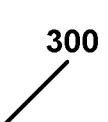

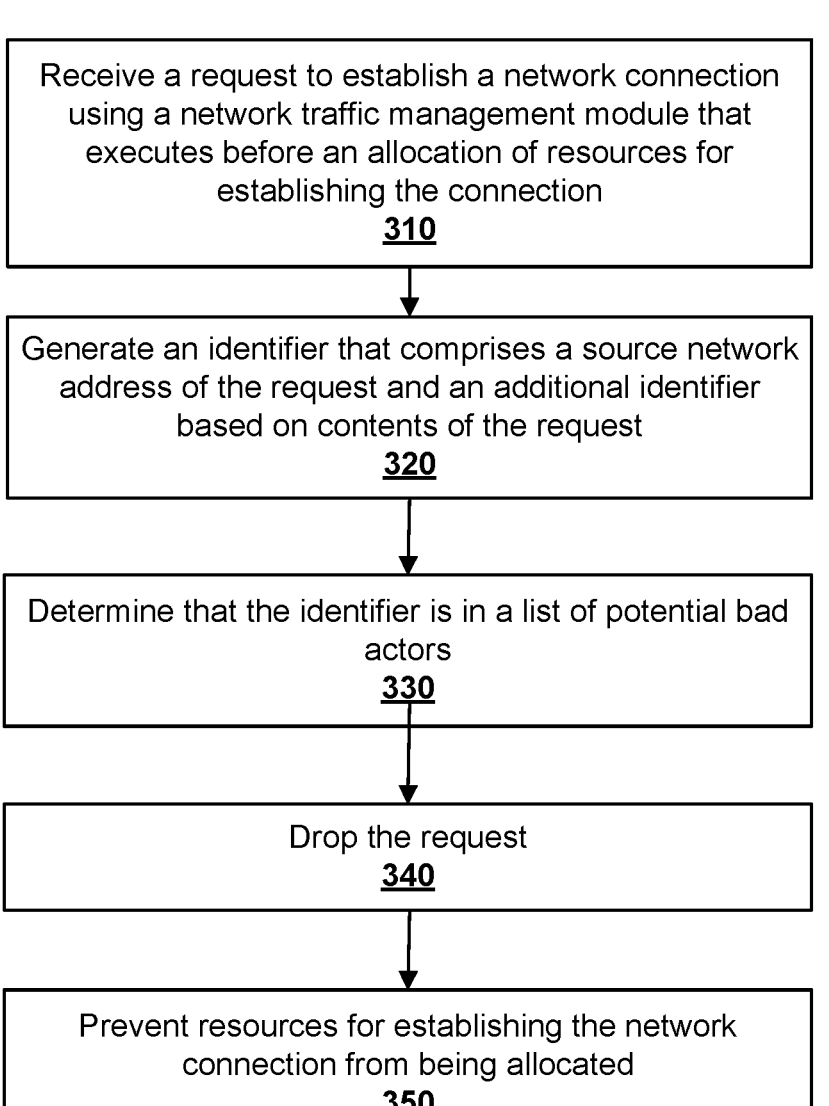

Receive a request to establish a network connection using a network traffic management module that executes before an allocation of resources for establishing the connection
310

Generate an identifier that comprises a source network address of the request and an additional identifier based on contents of the request
320

Determine that the identifier is in a list of potential bad actors
330

Drop the request
340

Prevent resources for establishing the network connection from being allocated
350

FIG. 5B
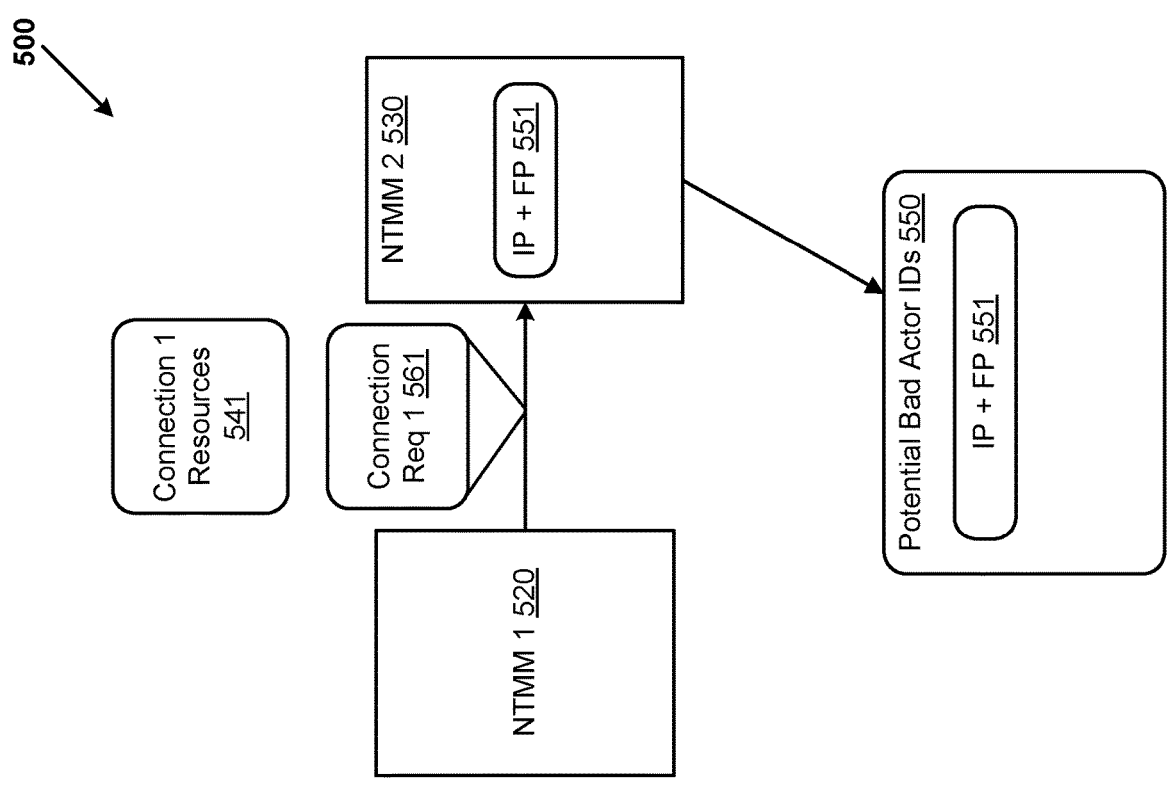
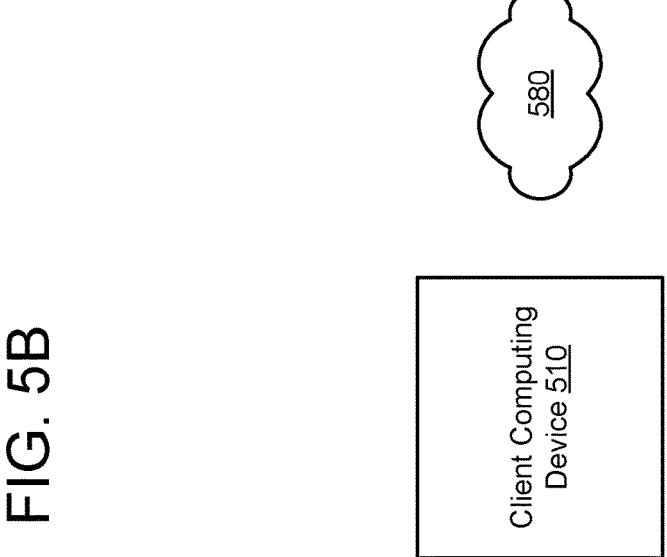

FIG. 6

600

```
┌─────────────────────────────────┐
│  Store an identifier generated   │
│  using a request to establish a  │
│  network connection and an       │
│  associated timestamp in a list  │
│  of potential bad actors         │
│              610                 │
└─────────────────────────────────┘
                 │
                 ▼
┌─────────────────────────────────┐
│  Transmit a challenge in         │
│  response to the request to      │
│  establish the network           │
│  connection                      │
│              620                 │
└─────────────────────────────────┘
                 │
                 ▼
┌─────────────────────────────────┐
│  Receive a second request from   │
│  the source of first request     │
│              630                 │
└─────────────────────────────────┘
```

Is time since the associated timestamp greater than a specified time limit?
640

YES

NO

Does the second request contain a correct answer to the challenge?
660

NO

YES

Reject the second request
650

Remove the identifier from the list of potential bad actors
670

VOLUMETRIC DISTRIBUTED DENIAL OF SERVICE ATTACK MITIGATION

FIELD

This technology generally relates to detection and mitigation of denial of service attacks.

BACKGROUND

A Denial of Service (DoS) attack is a type of cyber-attack in which the perpetrator seeks to make a machine or network resource unavailable to its intended users. This may be accomplished by temporarily or indefinitely disrupting the services of a host connected to the Internet. One method for performing a DoS attack is flooding the targeted machine with superfluous requests in an attempt to overload its system. When this happens, the machine can no longer process legitimate requests, effectively blocking users from accessing the service or resource. One type of DoS attack is a Distributed Denial of Service (DDoS) attack. In a DDoS attack, the attacker uses multiple compromised computers to launch a coordinated attack against one target. This can make it more difficult to stop since the attack comes from many different IP addresses, making it challenging to distinguish legitimate user traffic from attack traffic. In a volumetric DDoS attack, multiple compromised computers are used to flood a targeted network or site with an immense volume of network traffic.

BRIEF SUMMARY

In an example embodiment, a method is implemented by a network traffic management system, wherein the method comprises: receiving a request to establish a network connection using a network traffic management module, wherein the network traffic management module executes before an allocation of resources for establishing the network connection; generating, using the network traffic management module, an identifier using the request, wherein the identifier comprises a source network address of the request and an additional identifier based on contents of the request; determining, using the network traffic management module, that the identifier is in a list of potential bad actor identifiers; and based on the determining: dropping the request, and preventing the resources for establishing the network connection from being allocated.

In another example embodiment, a system comprises one or more network traffic management modules, a memory comprising programmed instructions stored thereon, and one or more processors configured to be capable of executing the stored programmed instructions to: receive a request to establish a network connection using a network traffic management module, wherein the network traffic management module executes before an allocation of resources for establishing the network connection; generate, using the network traffic management module, an identifier using the request, wherein the identifier comprises a source network address of the request and an additional identifier based on contents of the request; determine, using the network traffic management module, that the identifier is in a list of potential bad actor identifiers; and drop the request, and prevent the resources for establishing the network connection from being allocated.

Another example embodiment comprises a non-transitory computer readable medium having stored thereon instructions comprising executable code that, when executed by one or more processors, causes the processors to: receive a request to establish a network connection using a network traffic management module, wherein the network traffic management module executes before an allocation of resources for establishing the network connection; generate, using the network traffic management module, an identifier using the request, wherein the identifier comprises a source network address of the request and an additional identifier based on contents of the request; determine, using the network traffic management module, that the identifier is in a list of potential bad actor identifiers; and based on the determining: drop the request, and prevent the resources for establishing the network connection from being allocated.

Another example embodiment comprises a network traffic management apparatus, comprising memory comprising programmed instructions stored thereon and one or more processors configured to be capable of executing the stored programmed instructions to: receive a first request to establish a first network connection using a first network traffic management module, wherein the first network traffic management module executes after an allocation of resources for establishing the first network connection; determine, using the first network traffic management module, that the first request is from a potential bad actor; generate, using the first network traffic management module, an identifier using the first request, wherein the identifier comprises a source network address of the first request and an additional identifier based on contents of the first request; store, using the first network traffic management module, the identifier generated using the first request in a list of potential bad actor identifiers; receive a second request to establish a second network connection using a second network traffic management module, wherein the second network traffic management module executes before an allocation of resources for establishing the second network connection; generate the identifier, using the second network traffic management module, using the second request; determine, using the second network traffic management module, that the identifier is in the list of potential bad actor identifiers; and based on the determining: drop the second request, and prevent the resources for establishing the second network connection from being allocated.

BRIEF DESCRIPTION OF THE DRAWINGS

FIG. 1 is a flowchart of an example method for detecting network connection requests from potential bad actors.

FIG. 3 is a flowchart of an example method for dropping network connection requests from potential bad actors without allocating connection resources.

FIGS. 5A-F are system diagrams of an example system for mitigating volumetric DDoS attacks.

FIG. 6 is a flowchart of an example method for vetting potential bad actors in a system for mitigating DDoS attacks.

DETAILED DESCRIPTION

Figure 2:
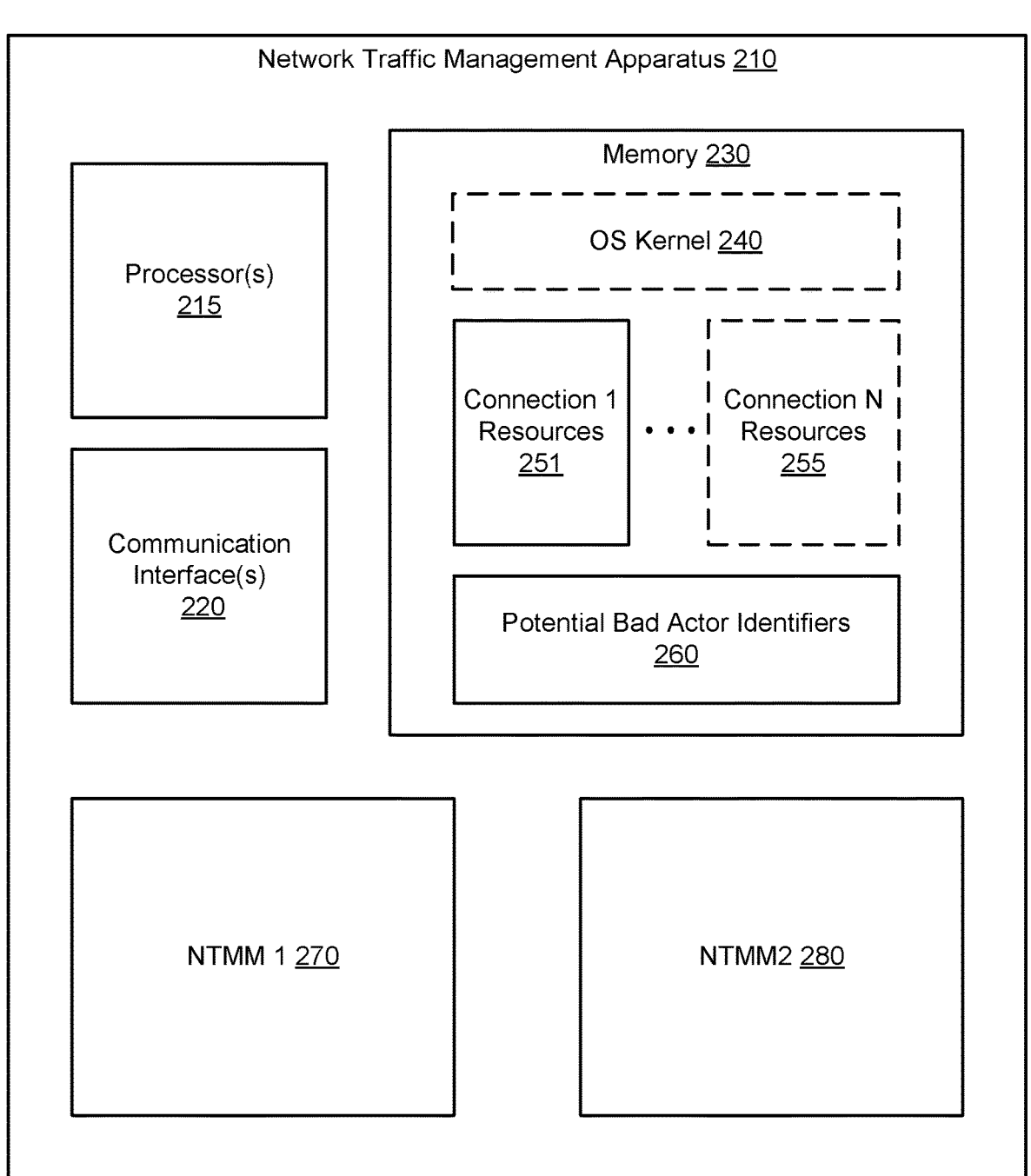
FIG. 2 is a network traffic management apparatus for mitigating volumetric distributed denial of service (DDoS) attacks.

Volumetric distributed denial of service (DDoS) attacks can be challenging to mitigate due to the significant volumes of network traffic that they generate. Even in scenarios where mechanisms are employed to detect and block bad actors, the volume of resources that are consumed by processing the large number of connection requests can be enough to exhaust available server resources. For example, when a connection request is received by a server, the server may allocate resources (such as memory) for establishing the requested connection before any logic is executed to determine whether the request is from a potential bad actor. In such a scenario, if the server receives a large volume of connection requests, the resources allocated for establishing the requested connections can exhaust available server memory even when logic to detect and block bad actors is employed.

At least some of the technologies described herein can be used to address this problem by dropping connection requests from potential bad actors before resources for establishing the requested connections are allocated. A first network traffic management module (NTMM) and a second NTMM can be used to detect and mitigate DDoS attacks, wherein the first NTMM executes before connection resources are allocated and the second NTMM executes after connection resources are allocated. The first and second NTMMs can be configured to execute as parts of a connection request processing pipeline, wherein the first NTMM receives inbound connection requests first, and before connection resources are allocated; and the second NTMM receives the inbound connection requests subsequently, and after connection resources have been allocated. For example, the first NTMM can comprise an extended Berkeley Packet Filter (eBPF) express data path (XDP) program and the second NTMM can comprise a server application module (such as an NGINX module).

The first and second NTMMs can share access to a list of potential bad actor identifiers. The second NTMM can be configured to detect potential bad actors based on contents of received connection requests. If the second NTMM determines that a connection request is from a potential bad actor, the second NTMM can generate an identifier based on contents of the connection request and can add the identifier to the list of potential bad actor identifiers. In some embodiments, the identifier can comprise a source network address of the request and an additional identifier based on contents of the request. For example, the additional identifier can comprise a hash based on transport layer (TLS) handshake information.

When a subsequent connection request from the same source is received, the first NTMM can generate the identifier based on contents of the subsequent request and can search the list of potential bad actor identifiers for the generated identifier. If the identifier is found in the list, then the first NTMM can drop the request. Since the first NTMM executes before connection resources are allocated, the request can be dropped before any connection resource allocation occurs. Thus, in at least some scenarios, exhaustion of server resources by volumetric DDoS attacks can be prevented.

In a particular embodiment, the second NTMM can store a timestamp in the list of potential bad actor identifiers in association with the generated identifier. When a subsequent request is received from the same source, the first NTMM will not drop the request if a specified amount of time has not elapsed since the time represented by the timestamp. Once the specified amount of time has elapsed, the first NTMM will begin to drop requests from the identified source. In such an embodiment, the second NTMM can transmit a challenge to the sender identified as a potential bad actor. By correctly answering the challenge, the sender can establish that they are not a bad actor. If a response to the challenge is received before the specified time period has elapsed, the first NTMM will not drop the request and the request will be processed by the second NTMM. If the second NTMM receives the correct answer to the challenge, the second NTMM can remove the generated identifier, and the associated timestamp, from the list of potential bad actors. Thus, in at least some scenarios, misidentification of legitimate users as potential bad actors can be prevented by allowing users to prove they are legitimate within a specified window of time.

FIG. 1 is a flowchart of an example method 100 for detecting network connection requests from potential bad actors. Any of the example systems and apparatuses described herein can be used to perform all or part of the example method 100. For example, the network traffic management apparatus 210, depicted in FIG. 2, can be used to perform all or part of the example method 100.

FIG. 2 is a block diagram of an example network traffic management apparatus 210 for mitigating distributed denial of service (DDoS) attacks. The network traffic management apparatus 210 can be implemented using a computing environment as described in more detail with reference to FIG. 8.

The network traffic management apparatus 210 comprises one or more processors 215, one or more communication interfaces 220, and a memory 230. The memory 230 can comprise programmed instructions stored thereon that can be executed by the one or more processors 215. The memory 230 comprises one or more connection resources 251-255 that can be allocated and used to manage network connections. The memory 230 further comprises a list of potential bad actor identifiers 260. Optionally, the memory 230 can comprise instructions for an operating system kernel 240. The network traffic management apparatus 210 further comprises a first network traffic management module 270 that executes before an allocation of resources for establishing a network connection and a second network traffic management module 280 that executes after an allocation of resources for establishing a network connection. The network traffic management modules 270 and 280 can comprise hardware and/or software components. For example, one or both of the network traffic management modules 270 and 280 can comprise programmed instructions that are stored in the memory 230 and that can be executed by the one or more processors 215.

Referring to FIG. 1, at 110, a request to establish a network connection is received at a network traffic management module that executes after an allocation of resources for establishing the network connection. For example, the network traffic management apparatus 210 can receive a request to establish a network connection using one or more of the communication interfaces 220. The request can be processed using the network traffic management module 280, which executes after an allocation of resources for establishing a network connection.

At 120, it is determined that the request is from a potential bad actor. For example, the network traffic management module 280 can determine if the request is from a potential bad actor. This can be done using an algorithm or rule set stored in the memory 230. In some embodiments, a machine learning model (not shown), such as a neural network, can be used to determine that the request is from a potential bad actor. The model can be trained using examples of network traffic, both from legitimate users and from known bad actors. Once the model has been trained, it can be used by the network traffic management module 280 to analyze new connection requests in real-time. For each new request to establish a network connection, the network traffic management module 280 can extract the relevant features and analyze them using the model to predict whether the connection request is from a legitimate user or a bad actor.

At 130, an identifier is generated that comprises a source network address of the request and an additional identifier based on contents of the request. For example, the network traffic management module 280 can generate an identifier for the request that comprises a source network address of the request and an additional identifier based on contents of the request. The additional identifier can comprise a hash of the request contents or some other unique identifier derived from the request data.

In a particular example, the additional identifier comprises a hash based on transport layer security (TLS) handshake information. A TLS handshake can begin when a client connects to a server over a network using a TLS protocol. This handshake can allow the server and client to authenticate one another and negotiate encryption algorithms and cryptographic keys before the application protocol (such as HTTP) transmits or receives its first byte of data. The additional identifier can be generated based on various pieces of information that are exchanged during the TLS handshake process. For instance, the identifier could be generated based on one or more of a cipher suite, session identifier, random byte strings exchanged by the client and server, certificate data, or the like. The additional identifier can be generated using a hash function (such as SHA-256).

At 140, the identifier is stored in a list of potential bad actor identifiers. For example, the identifier can be stored in the list of potential bad actor identifiers 260 in the memory 230 by the network traffic management module 280.

FIG. 3 is a flowchart of an example method 300 for dropping network connection requests from potential bad actors without allocating connection resources. Any of the example systems and apparatuses described herein can be used to perform all or part of the example method 300. For example, the network traffic management apparatus 210 depicted in FIG. 2, can be used to perform all or part of the example method 300.

At 310, a request to establish a network connection is received using a network traffic management module that executes before an allocation of resources for establishing the connection. For example, the network traffic manage module 270, which executes before allocation of connection resources, can receive the request to establish the network connection via one or more of the communication interfaces 220.

At 320, an identifier is generated that comprises a source network address of the request and an additional identifier based on contents of the request. For example, the network traffic management module 270 can generate the identifier based on the contents of the request. The network traffic management module 270 can be configured to generate identifiers in a same way as the network traffic management module 280. Thus, the network traffic management module 270 and the network traffic management module 280 can generate a same identifier for requests from a same sender.

At 330, it is determined that the identifier is in a list of potential bad actors. For example, the network traffic management module 270 can determine if the generated identifier is in the list of potential bad actor identifiers 260 stored in the memory 230.

At 340, the request is dropped. For example, the network traffic management module 270 can terminate processing of the request when the generated identifier is found in the list of potential bad actor identifiers 260. In such a scenario, the request may not be passed on to any other components or systems for further processing.

At 350, an allocation of resources for establishing the network connection is prevented. For example, by using the network traffic management module 270 to drop the connection before an allocation of connection resources (e.g., 251-255), the network traffic management apparatus 210 can prevent connection resources from being allocated.

Figure 4:
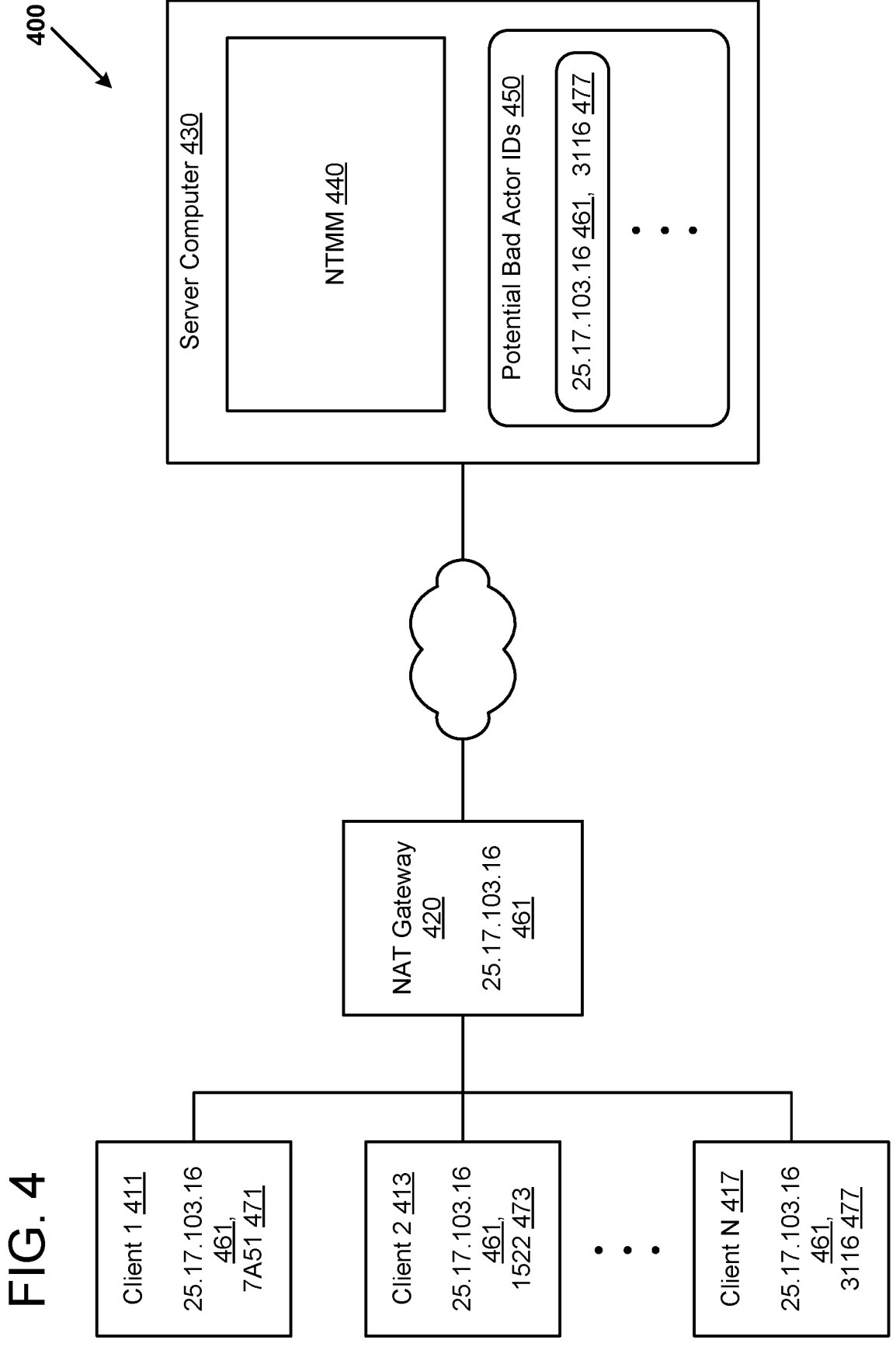
FIG. 4 is a system diagram of an example system for generating identifiers for multiple clients behind a same network address translation gateway.

FIG. 4 is a system diagram of an example system 400 for generating identifiers for multiple client computing devices 411-417 located behind a network address translation (NAT) gateway 420. The example system 400 can be used to perform all or part of any of the example methods described herein.

A server computer 430 can be configured to receive network connection requests from the client computing devices 411-417 via the NAT gateway 420. These requests can be processed by a network traffic management module 440. The network traffic management module 440 can generate identifiers based on the received requests and can check to see if any of the generated identifiers are included in a list of potential bad actor identifiers 450.

Since the requests from the client computers 411-417 travel through the NAT gateway 420, they may appear to have a same source network address from the perspective of the server computer 430. For example, the NAT gateway 420 can replace the source network addresses of the client computers 411-417 in the request headers with its own source network address 461. Thus, from the perspective of the server computer 430, it can appear as if all the connection requests from the client computers 411-417 originate from the NAT gateway 420. This can make it challenging to identify and block requests from a specific bad actor located behind the NAT gateway 420, since blocking connection requests using only the source network address can result in blocking requests from all the client computers 411-417 located behind the NAT gateway 420.

In at least some scenarios, this can be addressed by generating an additional identifier that, in combination with a source network address, can be used to uniquely identify the client computers 411-417 located behind the NAT gateway 420. For example, the network traffic management module 440 can generate an additional identifier that comprises a hash based on TLS handshake information. In the example depicted in FIG. 4, the requests from the client computers 411-417 all arrive at the server computer 430 with headers that contain the source network address 461. However, the network traffic management module 440 can generate additional identifiers 471-477 based on the contents of the connection requests. Using these additional identifiers, the server computer 430 can determine which of the client computing devices 411-417 sent the various connection requests.

When a potential bad actor is identified, the additional identifier can be stored in the list of potential bad actors 450 in combination with a source network address. When a subsequent connection request is received, the network traffic management module 440 can compare the source network address and generated additional identifier for the subsequent request to the source network addresses and additional identifiers stored in the list of potential bad actor identifiers 450. In the example depicted in FIG. 4, the network traffic management module 440 can determine that a connection request from the client computer 417 is from a potential bad actor since the combination of the source network address 461 and the additional identifier 477 is stored in the list of potential bad actors 450.

FIGS. 5A-F are system diagrams of an example system 500 for mitigating volumetric distributed denial of service (DDoS) attacks. The example system 500 comprises a client computing device 510 configured to communicate with a first network traffic management module 520 via a network 580. The first network traffic management module 520 is configured to execute before connection resources (e.g., 541) for network connections are allocated. The example system 500 further comprises a second network traffic management module 530 and a list of potential bad actor identifiers 550. The second network traffic management module 530 is configured to execute after connection resources (e.g., 541) for network connections are allocated. In at least some embodiments, the first network traffic management module 520 and the second network traffic management module 530 can execute on a same computing device. However, configurations where the network traffic management module 520 and the network traffic management module 530 are located on separate computing devices are also possible. The example system 500 can be used to perform all or part of any of the example methods described herein.

Figure 5A:
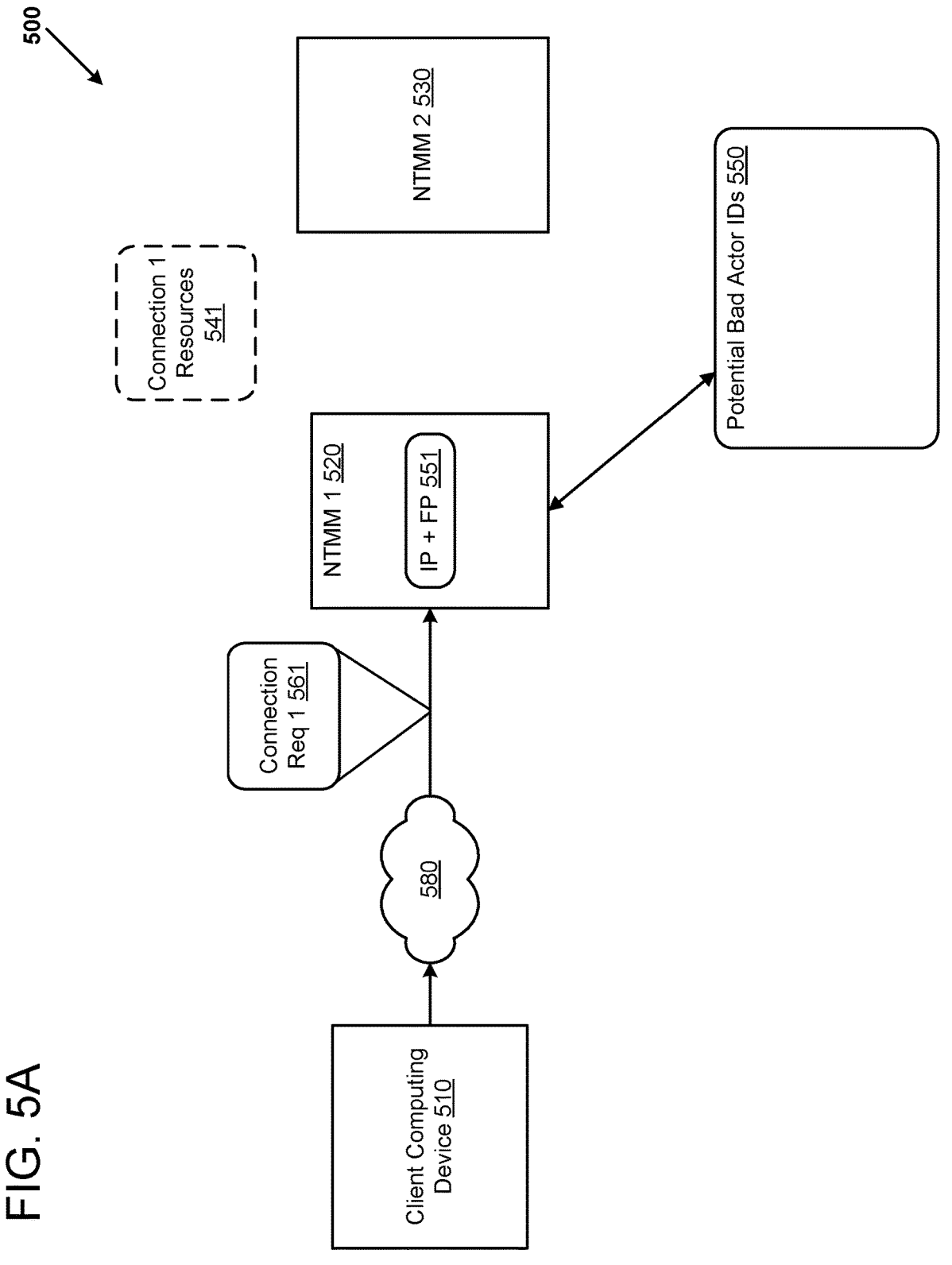

In FIG. 5A, the client computing device 510 transmits a connection request 561 via the network 580. The network traffic management module 520 receives and processes the connection request 561 before connection resources 541 are allocated. The network traffic management module 520 generates an identifier 551 that comprises a source network address (such as an IP address) and an additional identifier (such as a fingerprint value based on TLS handshake information) based on the connection request 561. The network traffic management module 520 checks the list of potential bad actors 550 and determines that it does not contain the identifier 551.

In FIG. 5B, connection resources 541 are allocated and the connection request 561 is received by the network traffic management module 530. The network traffic management module 530 can determine that the connection request 561 is from a potential bad actor. For example, the network traffic management module 530 can use a machine learning model (not shown), such as neural network, to determine there is a high likelihood that the request 561 was sent as part of a distributed denial of service attack. The network traffic management module 530 can generate the identifier 551 based on the contents of the connection request 561 and can add the identifier 551 to the list of potential bad actors 550.

Figure 5C:
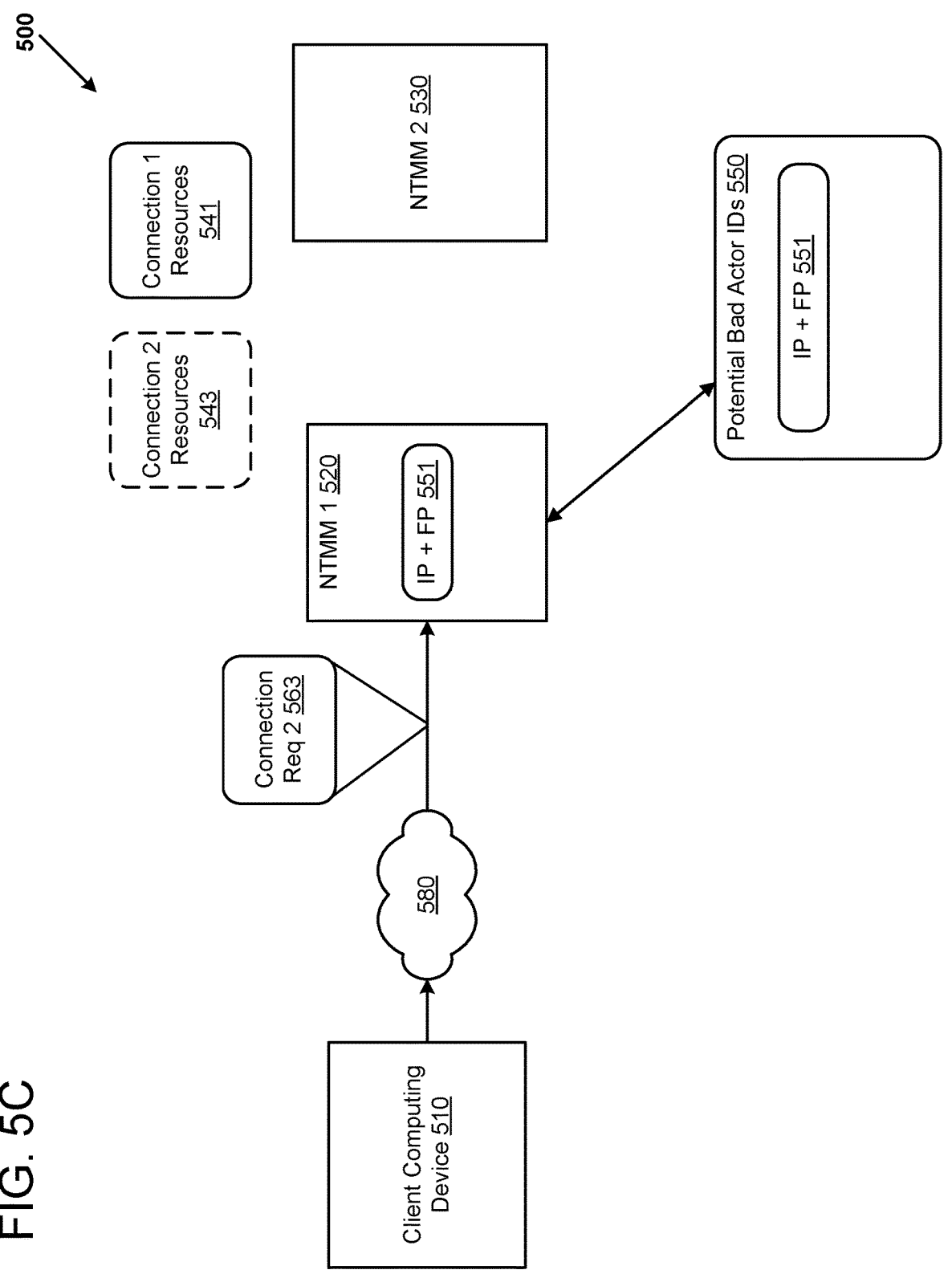
Figure 5D:
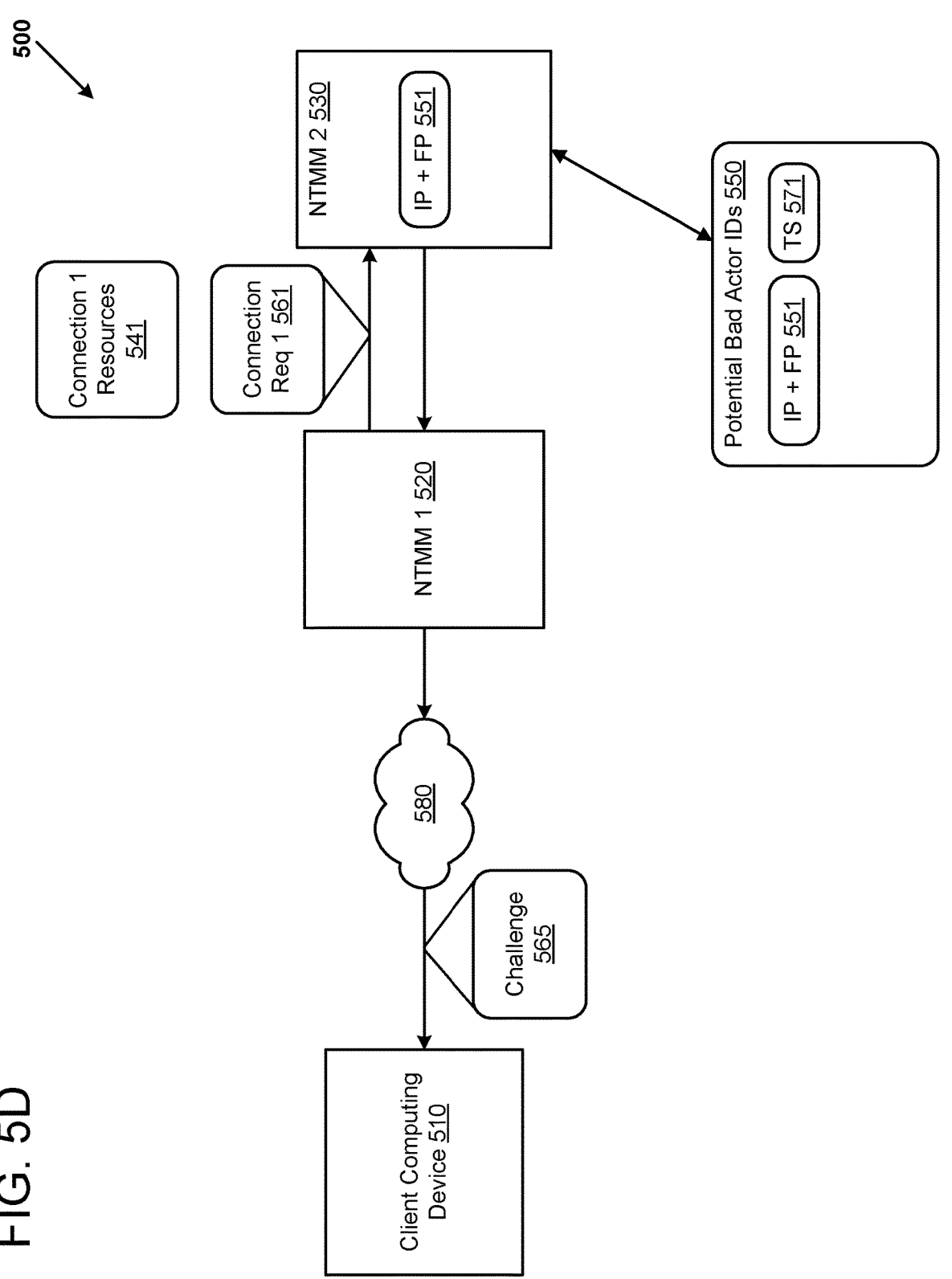
Figure 5E:
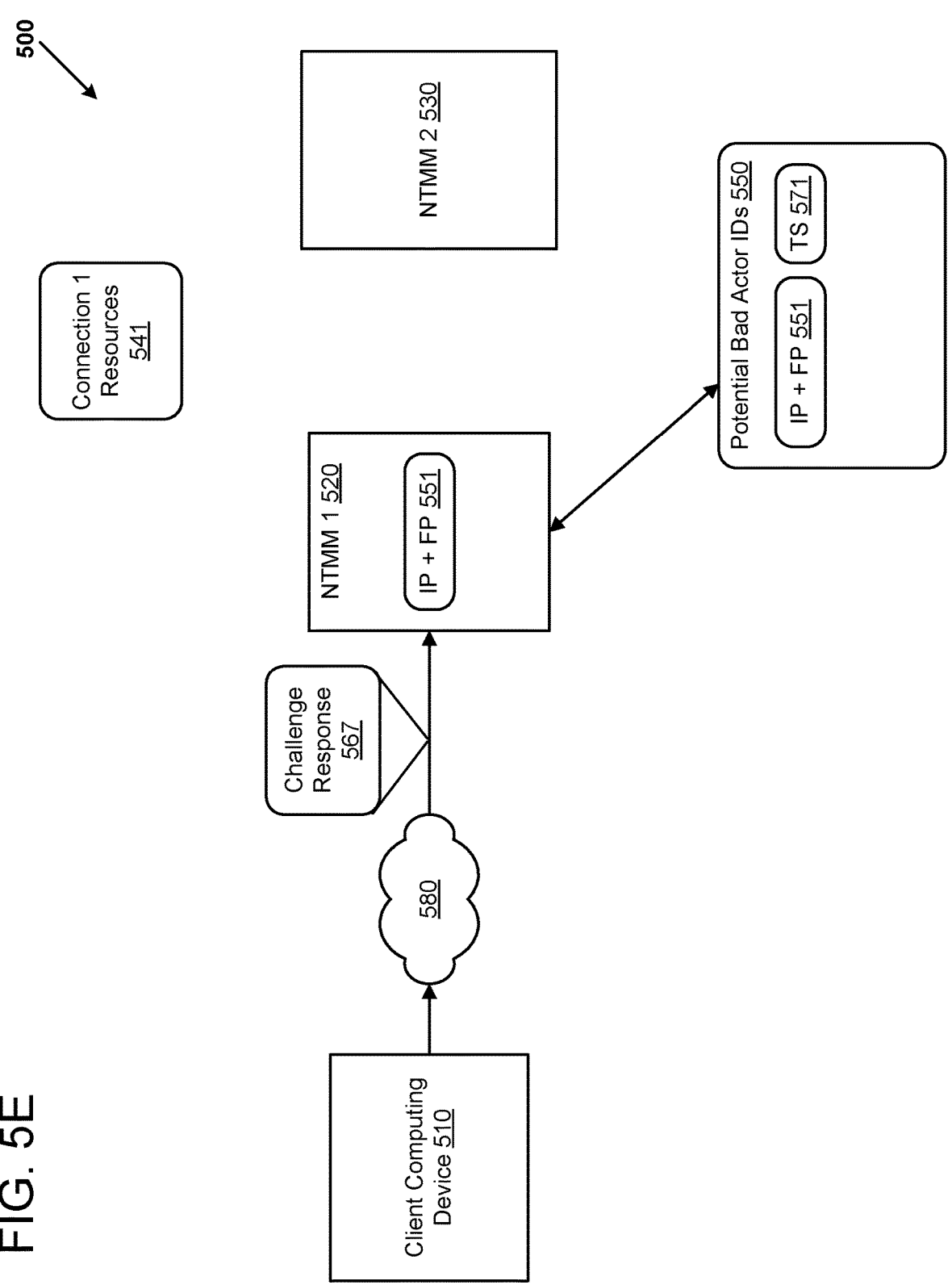
Figure 5F:
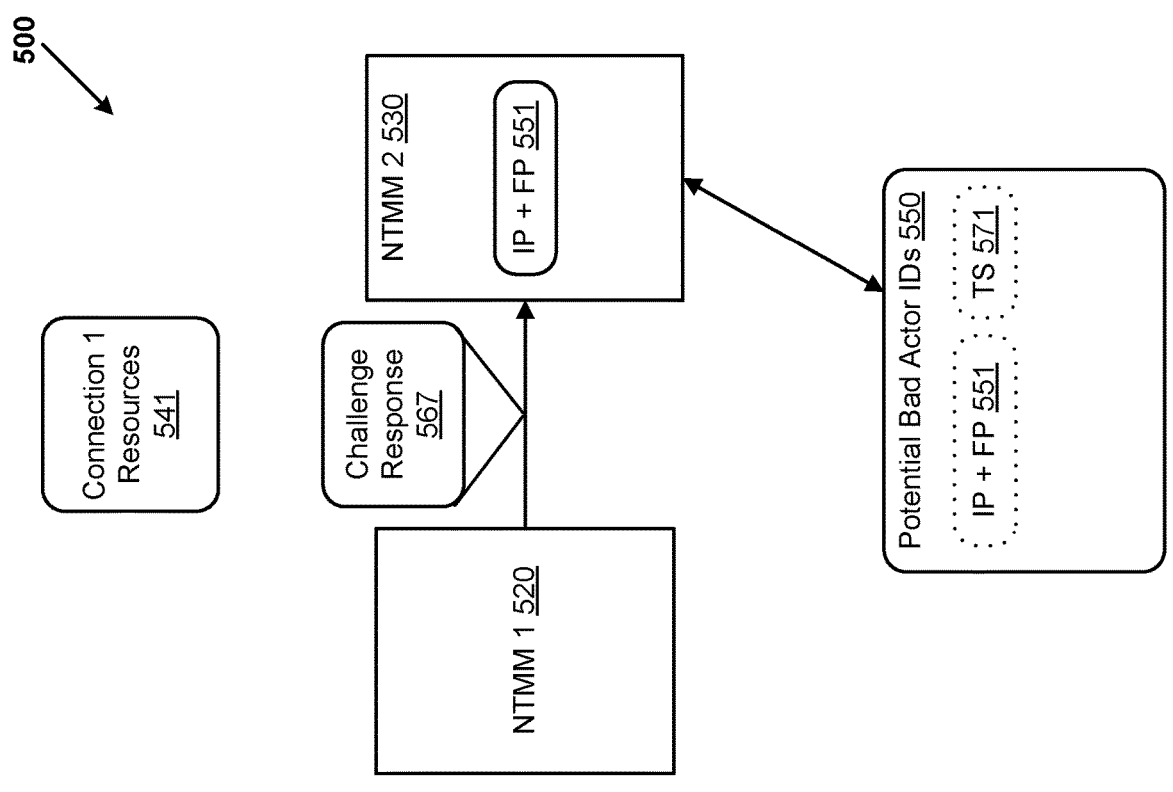

In FIG. 5C, a second connection request 563 is received by the network traffic management module 520 from the client computing device 510. The network traffic management module 520 generates the identifier 551 based on the contents of the connection request 563 and determines that the list of potential bad actors 550 now contains the identifier 551. Based on the determination, the network traffic management module 520 can drop the connection request 563 before the connection resources 543 are allocated. Thus, in at least some scenarios, connection requests from bad actors can be identified and dropped before connection resources are allocated.

In some embodiments, it is possible that legitimate network connection requests may be misidentified as requests from bad actors. For example, when a machine learning model is used to identify potential bad actors, the model may mislabel a legitimate connection request as malicious. Such false positive scenarios can be addressed by using additional processes for vetting potential bad actors.

FIG. 6 is a flowchart of an example method 600 for vetting potential bad actors in a system for mitigating distributed denial of service (DDoS) attacks. Any of the example systems and apparatuses described herein can be used to perform all or part of the example method 600. For example, the example system 500, depicted in FIGS. 5A-F can be used to perform all or part of the example method 600.

At 610, an identifier that is generated using a request to establish a network connection and an associated timestamp is stored in a list of potential bad actors. For example, referring to FIG. 5D, after determining the connection request 561 is from a potential bad actor, the network traffic management module 530 can generate the identifier 551 and store the identifier 551 in the list of potential bad actors 550 along with an associated timestamp 571. The timestamp 571 can comprise a representation of a time when the identifier 551 is added to the list 550. For example, the timestamp 571 can comprise a numerical value that represents a number of seconds that have elapsed since an epoch (such as the Unix Epoch).

At 620, a challenge is transmitted in response to the request to establish the network connection. For example, referring to FIG. 5D, a challenge 565 can be transmitted in a response to the client computing device 510. The challenge can take the form of a question or task that a human using a web browser or legitimate application can answer/complete within a specified time limit, but that a malicious application (such as a denial of service bot) cannot answer/complete, or cannot answer/complete within the specified time limit.

At 630, a second request is received from the source of the first request. For example, referring to FIG. 5E, a challenge response 567 is received in a request from the client computing device 510.

At 640, it is determined whether an amount of time that has elapsed since the associated timestamp is greater than a specified time limit. For example, referring to FIG. 5E, the network traffic management module 520 can generate the identifier 551 based on the request containing the challenge response 567, and can locate the entry for the identifier 551 in the list of potential bad actors 550. The network traffic management module 520 can then determine whether an amount of time that has elapsed since the time represented by the timestamp 571 is greater than a specified time limit.

If the amount of time that has elapsed is greater than the specified time limit then, at 650, the second request is rejected. For example, referring to FIG. 5E, if the time that has elapsed between adding the entry for the identifier 551 to the list 550 and receiving the challenge response 567 is greater than the specified time limit, then the network traffic management module 520 can reject the request containing the challenge response 567. All subsequent requests from the client computing device 510 can also be rejected. Since the network traffic management module 520 executes before connection resources are allocated, all subsequent requests from the client computing device 510 can be rejected without any additional connection resources being allocated.

If the amount of time that has elapsed since the associated timestamp is not greater than the specified time limit then, at 660, it is determined whether the second request contains a correct answer to the challenge. For example, referring to FIG. 5F, the network traffic management module 530 can determine whether the challenge response 567 contains a correct answer to the challenge 565.

If the second request contains the correct answer to the challenge then, at 670, the identifier is removed from the list of potential bad actors. For example, referring to FIG. 5F, the network traffic management module 530 can remove the entry for the identifier 551 from the list of potential bad actors 550.

If the second request does not contain the correct answer to the challenge then, at 650, the second request is rejected. For example, referring to FIG. 5F, if the challenge response 567 does not contain a correct answer to the challenge 565, the network traffic management module 530 can reject the request that contains the challenge response 567 and leave the entry for the identifier 551 in the list of potential bad actors 550. If a correct answer to the challenge 565 is not received within the specified time limit then all subsequent requests from the client computing device 510 can be rejected by the network traffic management module 520 before connection resources are allocated.

Figure 7:
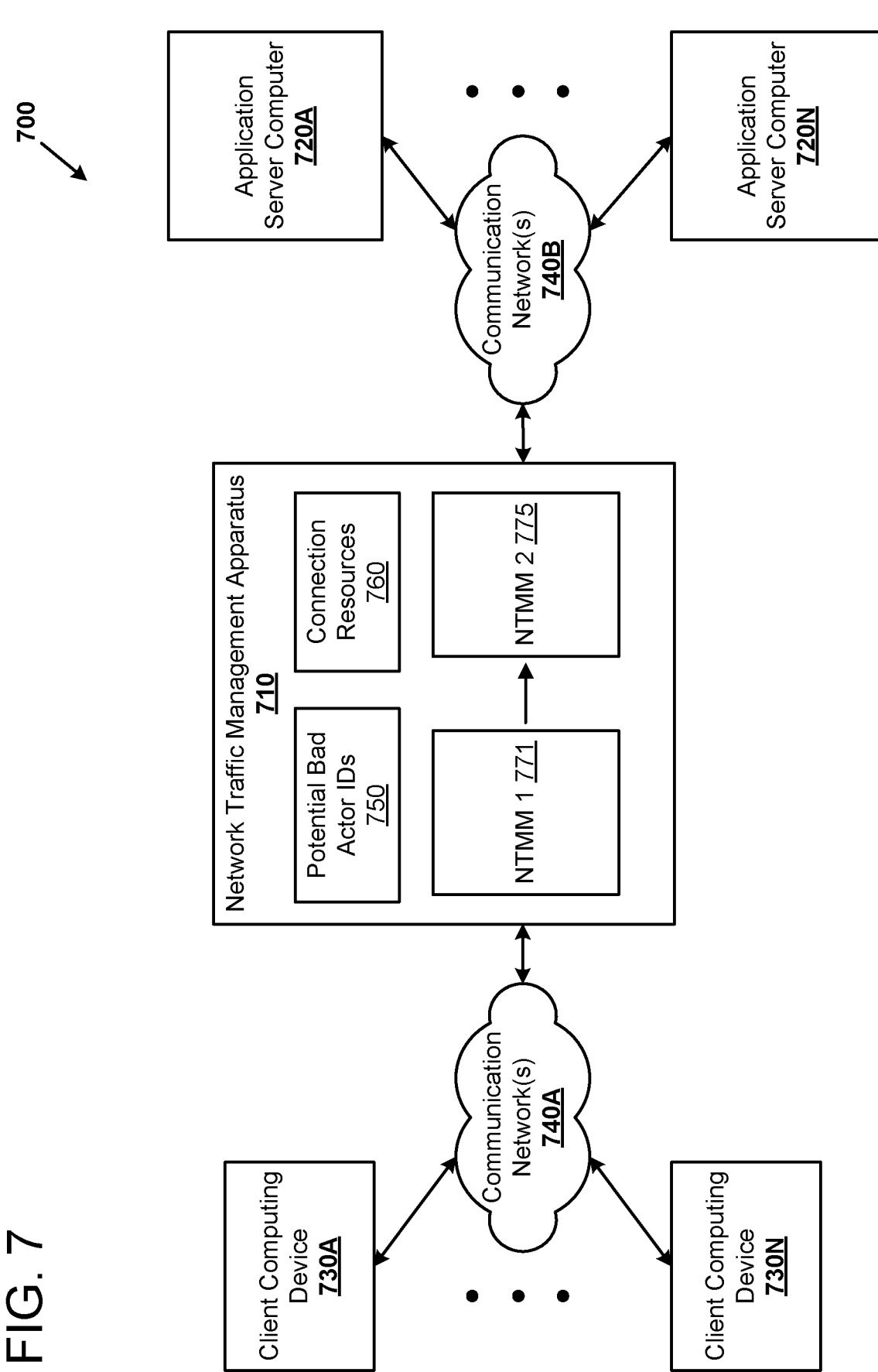
FIG. 7 is a block diagram of an example client-server architecture including a network traffic management apparatus configured to mitigate volumetric DDoS attacks.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as server computers 720A-N) and one or more client devices (such as client computing devices 730A-N) via one or more communication networks (such as the communication networks 740A and 740B). The server computers 720A-N can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
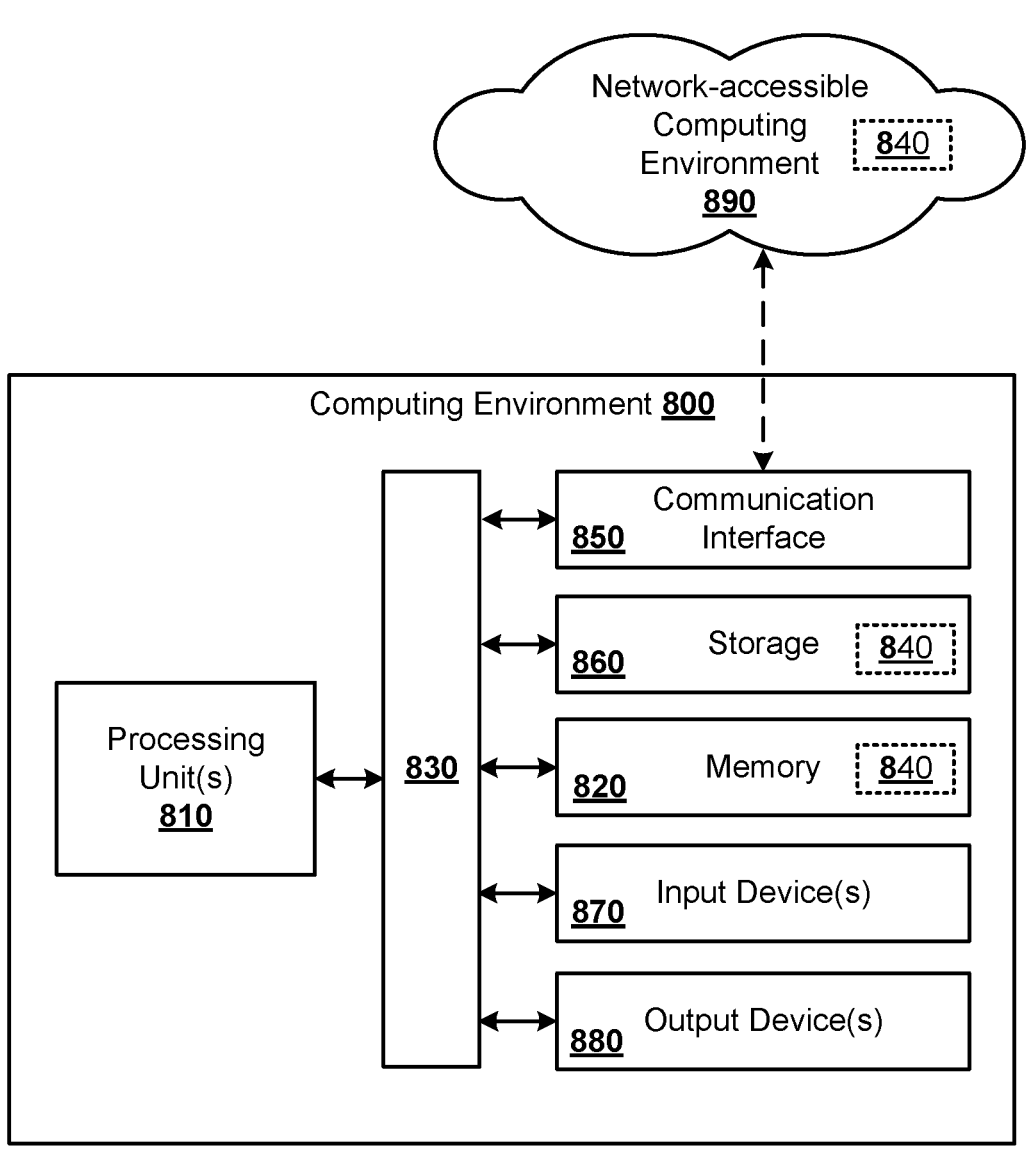
FIG. 8 is a block diagram of an example computing environment.

Generally, the server computers 720A-N, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N can include any type of computing device that can exchange network data. For example, the server computers 720A-N can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Each of the functions can be performed by a service. The services can be incorporated into workloads that are executed by the network traffic management apparatus 710 For example, the network traffic management apparatus 710 can include a workload that is used to perform proxy and other services on behalf of the server 720A-N and to manage traffic between the clients 730A-N and the servers 720A-N. Additionally, the network traffic management apparatus 710 can include other network devices such as one or more routers or switches, for example.

The network traffic management apparatus 710 can be used to perform any of the example methods described herein. The network traffic management apparatus 710 comprises a first network traffic management module 771 that executes before an allocation of connection resources 760 for establishing a network connection and a second network traffic management module 775 that executes after the allocation of the connection resources 760. The network traffic management apparatus 710 further comprises a list of potential bad actor identifiers 750.

In one example, a first request to establish a first network connection is received using the first network traffic management module 771. The first network traffic management module 771 generates an identifier based on contents of the first request and searches the list of potential bad actor identifiers 750 for the identifier. If the identifier is found in the list 750, then the request is dropped before the connection resources 760 are allocated. If the identifier is not in the list 750 then the connection resources 760 are allocated and the request is processed by the second network traffic management module 775. The second network traffic management module 775 can determine whether the request is from a potential bad actor. If the request is from a potential bad actor then the second network traffic management module 775 can generate the identifier and add the identifier to the list of potential bad actors 750.

In at least some embodiments, the second network traffic management module 760 can add a timestamp to the list 750 in association with the identifier. In such an embodiment, first network traffic management module 771 can drop subsequent requests from the potential bad actor if the timestamp is older than a specified time period.

Additionally or alternatively, the second network traffic management module 775 can transmit a challenge in a response to a sender of the request (e.g., one of the client computing devices 730A-N). If an answer to the challenge is received and the answer indicates that the sender of the request is not a bad actor then the second network traffic management module 775 can remove the identifier from the list of potential bad actors 750.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a computing device that performs operations for preventing access to secure network resources by an unauthorized virtual machine as described herein.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM), non-volatile memory (e.g., read-only memory (ROM), electrically erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model (such as the Internet Protocol Suite). The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, Wi-Fi (IEEE 802.11), and cellular).

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for performing operations as described herein) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present, or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations therefore is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system, the method comprising:

receiving a first request to establish a first network connection using a first network traffic management module, wherein the first network traffic management module executes after an allocation of resources for establishing the first network connection;

determining, using the first network traffic management module, that the first request is from a potential bad actor;

generating, using the first network traffic management module, an identifier using the first request, wherein the identifier comprises a source network address of the first request and an additional identifier based on contents of the first request;

storing, using the first network traffic management module, the identifier in a list of potential bad actor identifiers;

receiving a second request to establish a second network connection using a second network traffic management module, wherein the second network traffic management module executes before an allocation of resources for establishing the second network connection;

generating, using the second network traffic management module, the identifier using the second request;

determining, using the second network traffic management module, that the identifier is in the list of potential bad actor identifiers; and based on the determining:

dropping the second request, and preventing the resources for establishing the second network connection from being allocated.

2. The method of claim 1, further comprising:

transmitting, using the first network traffic management module, a challenge in a response to the potential bad actor;

receiving, using the first network traffic management module, an answer to the challenge that indicates that the potential bad actor is not a bad actor; and removing, using the first network traffic management module, the identifier from the list of potential bad actor identifiers.

3. The method of claim 1, further comprising:

storing, using the first network traffic management module, a timestamp in association with the identifier; and wherein dropping the second request and preventing the resources for establishing the second network connection from being allocated are further based on a determining, using the second network traffic management module, that the timestamp associated with the identifier is older than a specified time threshold time.

4. The method of claim 1, wherein:

the additional identifier comprises a hash based on transport layer security (TLS) handshake information.

5. The method of claim 1, wherein:

the network traffic management module comprises an extended Berkeley Packet Filter (eBPF) express data path (XDP) program.

6. A system comprising one or more network traffic management modules, a memory comprising programmed instructions stored thereon, and one or more processors configured to be capable of executing the stored programmed instructions to:

receive a first request to establish a first network connection using a first network traffic management module, wherein the first network traffic management module executes after an allocation of resources for establishing the first network connection;

determine, using the first network traffic management module, that the first request is from a potential bad actor;

generate, using the first network traffic management module, an identifier using the first request, wherein the identifier comprises a source network address of the first request and an additional identifier based on contents of the first request;

store, using the first network traffic management module, the identifier in a list of potential bad actor identifiers;

receive a second request to establish a second network connection using second a network traffic management module, wherein the second network traffic management module executes before an allocation of resources for establishing the second network connection;

generate, using the second network traffic management module, the identifier using the second request;

determine, using the second network traffic management module, that the identifier is in the list of potential bad actor identifiers; and based on the determining:

drop the second request, and prevent the resources for establishing the second network connection from being allocated.

7. The system of claim 6, wherein the one or more processors are further configured to be capable of executing the stored programmed instructions to:

transmit, using the first network traffic management module, a challenge in a response to the potential bad actor;

receive, using the first network traffic management module, an answer to the challenge that indicates that the potential bad actor is not a bad actor; and remove, using the first network traffic management module, the identifier from the list of potential bad actor identifiers.

8. The system of claim 6, wherein the one or more processors are further configured to be capable of executing the stored programmed instructions to:

store, using the first network traffic management module, a timestamp in association with the identifier; and wherein dropping the second request and preventing the resources for establishing the second connection from being allocated are further based on a determining, using the second network traffic management module, that the timestamp associated with the identifier is older than a specified time threshold time.

9. The system of claim 6, wherein:

the additional identifier comprises a hash based on transport layer security (TLS) handshake information.

10. The system of claim 6, wherein:

the network traffic management module comprises an extended Berkeley Packet Filter (eBPF) express data path (XDP) program.

11. A non-transitory computer readable medium having stored thereon instructions comprising executable code that, when executed by one or more processors, causes the processors to:

receive a first request to establish a first network connection using a first network traffic management module, wherein the first network traffic management module executes after an allocation of resources for establishing the first network connection;

determine, using the first network traffic management module, that the first request is from a potential bad actor;

generate, using the first network traffic management module, an identifier using the first request, wherein the identifier comprises a source network address of the first request and an additional identifier based on contents of the first request;

store, using the first network traffic management module, the identifier in a list of potential bad actor identifiers;

receive a second request to establish a second network connection using a second network traffic management module, wherein the second network traffic management module executes before an allocation of resources for establishing the second network connection;

generate, using the second network traffic management module, the identifier using the second request;

determine, using the second network traffic management module, that the identifier is in the list of potential bad actor identifiers; and based on the determining:

drop the second request, and prevent the resources for establishing the second network connection from being allocated.

12. The non-transitory computer readable medium of claim 11, wherein the instructions further comprise executable code that, when executed by one or more processors, causes the processors to:

transmit, using the first network traffic management module, a challenge in a response to the potential bad actor;

receive, using the first network traffic management module, an answer to the challenge that indicates that the potential bad actor is not a bad actor; and remove, using the first network traffic management module, the identifier from the list of potential bad actor identifiers.

13. The non-transitory computer readable medium of claim 11, wherein the instructions further comprise executable code that, when executed by one or more processors, causes the processors to:

store, using the first network traffic management module, a timestamp in association with the identifier; and wherein dropping the second request and preventing the resources for establishing the second connection from being allocated are further based on a determining, using the second network traffic management module, that the timestamp associated with the identifier is older than a specified time threshold time.

14. The non-transitory computer readable medium of claim 11, wherein:

the additional identifier comprises a hash based on transport layer security (TLS) handshake information.

15. The non-transitory computer readable medium of claim 11, wherein:

the network traffic management module comprises an extended Berkeley Packet Filter (eBPF) express data path (XDP) program.

16. A network traffic management apparatus, comprising memory comprising programmed instructions stored thereon and one or more processors configured to be capable of executing the stored programmed instructions to:

receive a first request to establish a first network connection using a first network traffic management module, wherein the first network traffic management module executes after an allocation of resources for establishing the first network connection;

determine, using the first network traffic management module, that the first request is from a potential bad actor;

generate, using the first network traffic management module, an identifier using the first request, wherein the identifier comprises a source network address of the first request and an additional identifier based on contents of the first request;

store, using the first network traffic management module, the identifier generated using the first request in a list of potential bad actor identifiers;

receive a second request to establish a second network connection using a second network traffic management module, wherein the second network traffic management module executes before an allocation of resources for establishing the second network connection;

generate the identifier, using the second network traffic management module, using the second request;

determine, using the second network traffic management module, that the identifier is in the list of potential bad actor identifiers; and based on the determining:

drop the second request, and prevent the resources for establishing the second network connection from being allocated.

17. The network traffic management apparatus of claim 16, wherein:

the second network traffic management module comprises an extended Berkeley Packet Filter (eBPF) express data path (XDP) program.

* * * * *